US008431502B2

(12) United States Patent
Dejneka et al.

(10) Patent No.: US 8,431,502 B2
(45) Date of Patent: *Apr. 30, 2013

(54) SILICATE GLASSES HAVING LOW SEED CONCENTRATION

(75) Inventors: Matthew John Dejneka, Corning, NY (US); Sinue Gomez, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/495,355

(22) Filed: Jun. 13, 2012

(65) Prior Publication Data

US 2012/0252652 A1   Oct. 4, 2012

Related U.S. Application Data

(60) Continuation of application No. 13/346,235, filed on Jan. 9, 2012, which is a division of application No. 12/392,577, filed on Feb. 25, 2009, now Pat. No. 8,158,543.

(60) Provisional application No. 61/067,130, filed on Feb. 26, 2008.

(51) Int. Cl.
C03C 3/083 (2006.01)
C03C 3/091 (2006.01)

(52) U.S. Cl.
USPC ................ 501/68; 501/66; 501/69

(58) Field of Classification Search .......... 501/66, 501/67, 68, 69
See application file for complete search history.

(56) References Cited

U.S. PATENT DOCUMENTS

| 3,451,796 | A | 6/1969 | Mochel |
| 3,485,702 | A | 12/1969 | Mochel |
| 3,652,303 | A | 3/1972 | Janakirama Rao |
| 3,752,729 | A | 8/1973 | Mochel |
| 3,790,430 | A | 2/1974 | Mochel |
| 3,885,976 | A | 5/1975 | Snitzer |
| 3,954,656 | A | 5/1976 | Deeg et al. |
| 4,028,131 | A | 6/1977 | Pons |
| 5,277,946 | A | 1/1994 | Nagai et al. |
| 5,785,726 | A | 7/1998 | Dorfeld et al. |
| 5,895,768 | A | 4/1999 | Speit |
| 5,922,097 | A | 7/1999 | Kobayashi et al. |
| 6,087,284 | A | 7/2000 | Brix et al. |
| 6,235,667 | B1 | 5/2001 | Paloschi et al. |
| 6,306,786 | B1 | 10/2001 | Koyama et al. |
| 6,380,112 | B1 | 4/2002 | Kolberg et al. |
| 6,465,381 | B1 | 10/2002 | Lautenschlager et al. |
| 6,518,211 | B1* | 2/2003 | Bradshaw et al. ............. 501/69 |
| 6,627,569 | B1 | 9/2003 | Naumann et al. |
| 6,753,279 | B2 | 6/2004 | Kohli |
| 6,815,882 | B2 | 11/2004 | Murakami et al. |
| 6,818,576 | B2 | 11/2004 | Ikenishi et al. |
| 7,141,521 | B2 | 11/2006 | Siebers et al. |
| 7,491,668 | B2 | 2/2009 | Fechner et al. |
| 7,635,521 | B2 | 12/2009 | Aitken et al. |
| 7,666,511 | B2 | 2/2010 | Ellison et al. |
| 7,709,406 | B2 | 5/2010 | Cornelius et al. |
| 7,763,559 | B2 | 7/2010 | Kurachi et al. |
| 7,833,919 | B2 | 11/2010 | Danielson et al. |
| 7,854,144 | B2 | 12/2010 | DeLamielleure et al. |
| 7,908,886 | B2 | 3/2011 | Cornelius et al. |
| 8,158,543 | B2* | 4/2012 | Dejneka et al. ............... 501/68 |
| 8,187,987 | B2* | 5/2012 | Amin et al. .................. 501/69 |
| 8,232,218 | B2* | 7/2012 | Dejneka et al. ............... 501/68 |
| 2004/0050106 | A1 | 3/2004 | Murnane |
| 2004/0071960 | A1 | 4/2004 | Weber et al. |
| 2004/0075086 | A1 | 4/2004 | Wolff et al. |
| 2004/0186000 | A1 | 9/2004 | Kawamoto et al. |
| 2005/0000248 | A1 | 1/2005 | Lauten-Schlaeger et al. |
| 2005/0090377 | A1 | 4/2005 | Shelestak et al. |
| 2005/0250639 | A1 | 11/2005 | Siebers et al. |
| 2006/0006786 | A1 | 1/2006 | Fechner et al. |
| 2006/0270545 | A1 | 11/2006 | Landa et al. |
| 2007/0060465 | A1 | 3/2007 | Varshneya et al. |
| 2007/0227188 | A1 | 10/2007 | Carty |
| 2008/0020919 | A1 | 1/2008 | Murata |
| 2009/0142568 | A1* | 6/2009 | Dejneka et al. ............ 428/220 |

FOREIGN PATENT DOCUMENTS

| CN | 1450010 A | 10/2003 |
| CN | 1546405 A | 11/2004 |
| EP | 0253188 A1 | 1/1988 |
| EP | 0444821 A1 | 9/1991 |
| EP | 1653499 A1 | 5/2006 |
| JP | 63230536 A | 9/1988 |
| JP | 07-053235 | 2/1995 |
| JP | 10072238 | 3/1998 |
| JP | H10114529 A | 5/1998 |
| JP | H1129339 A | 2/1999 |
| JP | H11079755 A | 3/1999 |
| JP | 2000-001331 | 1/2000 |
| JP | 2001076336 | 3/2001 |
| JP | 2004131314 A | 4/2004 |

(Continued)

OTHER PUBLICATIONS

Machine Translation of JP 2001-076336 A, Mar. 23, 2001.*
Japanese Office Action pertaining to Application No. 2010-548676 dated Mar. 21, 2012.
Fujita et al., "Influence of Refining Agent in Soda Lime Glass for Ultraviolet Ray Transmittance", Matrials Transactions, vol. 49, No. 2, pp. 372-375, Jan. 17, 2008—http://www.jim.or.jp/journal/e/pdf3/49/02/372.pdf.
Jenkins et al., "Final Report, Preliminary Investigation into the Vitrification of Salts from Evaporated Drain Water", Oct. 1998—http://jenkins.ucdavis.edu/projects/Salt/SaltVitrificationFinalReport.pdf.
Kloss et al., "Advances in the process of floating borosilicate glasses and some recent applications for specialty borosilicate float glasses", Glass Technology, vol. 41, No. 6, pp. 177-181, Dec. 2000.

(Continued)

Primary Examiner — Karl Group
Assistant Examiner — Elizabeth A Bolden
(74) Attorney, Agent, or Firm — Robert P. Santandrea

(57) ABSTRACT

A fusion formable and ion exchangeable silicate glass having a seed concentration of less than about 1 seed/cm$^3$.

30 Claims, 3 Drawing Sheets

FOREIGN PATENT DOCUMENTS

| | | |
|---|---|---|
| JP | 2005089259 A | 4/2005 |
| JP | 2009084075 | 4/2009 |
| WO | 9513993 A1 | 5/1995 |
| WO | 2009105189 A1 | 8/2009 |

OTHER PUBLICATIONS

International Preliminary Report on Patentability and Search Report pertaining to Application No. PCT/US09/01063 dated Feb. 4, 2010.
Election/Restriction pertaining to U.S. Appl. No. 13/346,235 dated Jun. 8, 2012.
Office Action pertaining to U.S. Appl. No. 13/346,235 dated Jul. 24, 2012.
Office Action pertaining to Chinese Patent Application No. 200980111940.5 dated Aug. 31, 2012.
Office Action pertaining to U.S. Appl. No. 13/346,235 dated Nov. 7, 2012.
Office Action pertaining to Japanese Patent Application No. 2010-548676 dated Oct. 30, 2012.
European Application No. 09716064.2 Search Report dated Feb. 14, 2013.

* cited by examiner

SILICATE GLASSES HAVING LOW SEED CONCENTRATION

CROSS-REFERENCE TO RELATED APPLICATIONS

This application is a continuation of U.S. application Ser. No. 13/346,235, filed Jan. 9, 2012, which is a divisional of U.S. application Ser. No. 12/392,577 filed Feb. 25, 2009, (now U.S. Pat. No. 8,158,543), and claims the benefit of U.S. Provisional Application Ser. No. 61/067,130 filed on Feb. 26, 2008, the contents of which are incorporated by reference herein in their entirety.

BACKGROUND

During glass formation from the melt, contaminants in the melt tend to form gas bubbles, also referred to in the art as "seeds." Such seeds affect the performance and quality of the glass, and efforts are made to remove or "fine" them from the glass.

Seed formation is problematic for silicate glasses. In particular, aluminosilicate glasses and other silicate glasses that melt at high temperature are much more difficult to fine than other glasses. The high viscosities of such glasses slow the rate of bubble removal by via Stokes fining; i.e., allowing the bubbles to rise to the surface of the melt due to buoyancy.

Fining agents such as $As_2O_3$, $Sb_2O_3$, and halides have been used to remove bubbles from aluminosilicate glasses. These chemical fining packages work by releasing gas to existing bubbles, causing them to increase in size and rise more quickly to the top of the melt. However, these components are toxic, hazardous to handle, expensive, and undesirable for environmentally green products and processes. Sulfate fining agents have also been used in soft glasses. However, they contribute to sulfur emissions and actually exacerbate seed formation in aluminosilicate glasses.

SUMMARY

A fusion formable and ion exchangeable silicate glass having a seed concentration of less than about 1 seed/$cm^3$ is also provided.

Accordingly, one aspect of the disclosure is to provide a silicate glass. the silicate glass has a seed concentration of less than about 1 seed/$cm^3$. In some embodiments, the silicate glass comprises: 60-72 mol % $SiO_2$; 6-14 mol % $Al_2O_3$; 0-15 mol % $B_2O_3$; 0-1 mol % $Li_2O$; 0-20 mol % $Na_2O$; 0-10 mol % $K_2O$; 0-2.5 mol % CaO; 0-5 mol % $ZrO_2$; 0-1 mol % $SnO_2$; and 0-1 mol % $CeO_2$, wherein 12 mol %$\leq Li_2O+Na_2O+K_2O\leq 20$ mol %, and wherein the silicate glass comprises less than 50 ppm $As_2O_3$. In other embodiments, the silicate glass comprises: 60-72 mol % $SiO_2$; 6-14 mol % $Al_2O_3$; 0.63-15 mol % $B_2O_3$; 0-1 mol % $Li_2O$; 0-20 mol % $Na_2O$; 0-10 mol % $K_2O$; 0-10 mol % CaO; 0-5 mol % $ZrO_2$; 0-1 mol % $SnO_2$; and 0-1 mol % $CeO_2$, wherein 12 mol %$\leq Li_2O+Na_2O+K_2O\leq 20$ mol %. In further embodiments, the silicate glass comprises: 60-72 mol % $SiO_2$; 6-14 mol % $Al_2O_3$; 0-15 mol % $B_2O_3$; 0-1 mol % $Li_2O$; 0-20 mol % $Na_2O$; 0-10 mol % $K_2O$; 0-10 mol % CaO; 0-5 mol % $ZrO_2$; 0-1 mol % $SnO_2$; and 0-1 mol % $CeO_2$, wherein 12 mol %$\leq Li_2O+Na_2O+K_2O\leq 20$ mol %, wherein 0.1 mol %$\leq SnO_2+CeO_2\leq 2$ mol %, and wherein the silicate glass is formed from batch or raw materials that include at least one oxidizer fining agent.

These and other aspects, advantages, and salient features will become apparent from the following detailed description, the accompanying drawings, and the appended claims.

DETAILED DESCRIPTION

Figure 1:
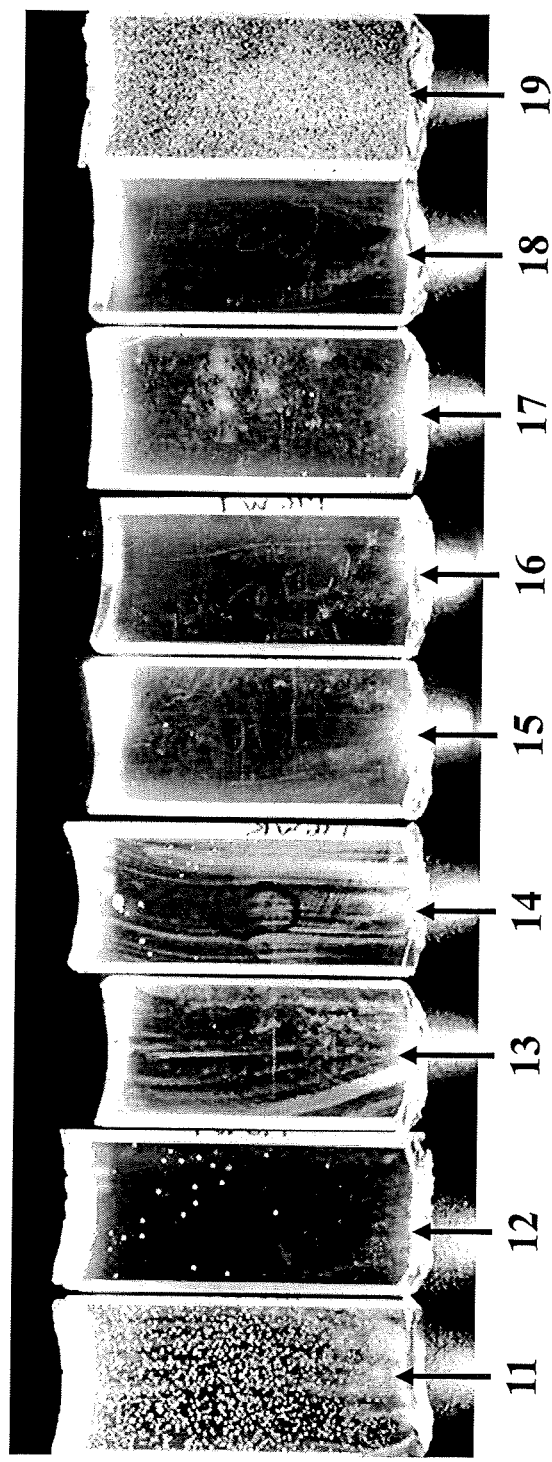
FIG. 1 is a photograph of polished cross sections of glasses obtained from melts containing fining agents.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist of, or consist essentially of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the recited range.

Referring to the drawings in general and to FIG. 1 in particular, it will be understood that the illustrations are for the purpose of describing particular embodiments and are not intended to limit the disclosure and appended claims thereto.

Glasses having relatively high viscosities (i.e., 200 Poise viscosities of between about 1500° C. and 1675° C.) may require melting to obtain a glass having low levels of inclusions. Gaseous inclusions, blisters, or bubbles, which are also referred to herein as "seeds," tend to have an adverse affect of the optical quality and properties of the glass. For example, the presence of seeds affects the refractive index, density, and transmission of light through the glass. To aid in eliminating or reducing the concentration of these gaseous inclusions, it is, in some instances, useful to add chemical fining agents. Such fining agents fill early-stage bubbles with gas, thus increasing the velocity at which the bubbles rise through the melt. Typical fining agents include, but are not limited to: oxides of arsenic, antimony, tin and cerium; metal halides (fluorides, chlorides and bromides); metal sulfates; and the like. Arsenic oxides are particularly effective fining agents because they release oxygen very late in the melt stage. However, arsenic and antimony are generally regarded as hazardous materials. Therefore, it may be advantageous in particular applications to completely avoid using arsenic or antimony, and instead use a nontoxic component to produce a fining effect.

As described herein, the number of seeds within silicate glasses is reduced by providing fining agents that comprise at least one inorganic compound that acts as a source of water at a temperature of a melt formed by the mixture of raw materials (also referred to herein as the "batch" or "batch materials") that are used to form the silicate glass. The inorganic compound may melt or decompose at a temperature below the temperature of the melt, generating water. The water is initially dissolved as a vapor in the melt. As the temperature of the melt increases, the water vapor comes out of solution and is captured by bubbles already present in the melt. The captured water vapor fills the bubbles with steam and expands the bubbles, causing them to rise more quickly to the surface of the melt and escape. For example, aluminum hydroxide (Al(OH)$_3$), which is used as a fining agent, decomposes to form boehmite (AlO.(OH)) and water at temperatures below those at which a melt initially appears. The boehmite will decompose at higher temperatures to form alumina (Al$_2$O$_3$) and water. The water produced by this two-step decomposition will eventually be captured by bubbles already present in the melt, increasing the size of these bubbles and causing them to rise to the surface of the melt, where they escape. The fining agent is also substantially free of arsenic and antimony.

In one embodiment, the water source comprises at least one of a hydrate, a metal hydroxide, and combinations thereof. Hydrates are solid inorganic compounds that contain water molecules, which are either bound to a metal or silicon center or crystallized with a metal complex. Such hydrates are said to contain "water of crystallization" or "water of hydration." With the exception of boric acid, such hydrates may include hydrates of oxides or salts formed by any of the constituents (e.g., alumina, alkali and alkali earth metals, zirconium) of the silicate glass. Metal hydroxides are compounds that comprise a metal and the diatomic hydroxyl OH$^-$ anion.

Non-limiting examples of inorganic or metal hydrates and hydroxides include, but are not limited to: phyllosilicates, such as clays and micas; zeolites; other hydrated silicates; and the like. Clays that may be used as a water source in the fining agent include, but are not limited to: aluminum silicate hydroxides, such as kaolinite and pyrophillite; talc (magnesium silicate hydroxide); montmorillonite-smectite (e.g., Bentonite); and combinations thereof, such as clinochlore ((Mg$_5$Al)(AlSi$_3$)O$_{10}$(OH)$_8$). Zeolites are hydrated aluminosilicates having symmetrically stacked alumina and silica tetrahedra that form an open, stable, three-dimensional honeycomb structure having a negative charge. Zeolites that may be used as a water source in the fining agent include, but are not limited to: mineral zeolites, such as analcime, chabazite, heulandite, natrolite, phillipsite, stilbite, and mordenite. Natrolite (Na$_2$Al$_2$Si$_3$O$_{10}$.2H$_2$O) has a formula that is typical of such mineral zeolites. Synthetic zeolites such as zeolite A, ZSM-5, and the like may also be used in the fining agent.

In one embodiment, the fining agent includes at least one metal hydroxide. Such hydroxides may include the hydroxides formed by any of the constituents (e.g., alumina ((Al(OH)$_3$); alkali (e.g., NaOH, KOH, LiOH) and alkali earth (Mg(OH)$_2$, Ca(OH)$_2$, Sr(OH)$_2$, Ba(OH)$_2$) metals; and zirconium (Zr(OH)$_4$)) of the silicate glass. Additionally, the fining agent may comprise the mineral hydroromarchite (Sn$_3$O$_2$(OH)$_2$), and/or hydroxides of zinc (Zn(OH)$_2$) and gallium (Ga(OH)$_3$).

In another embodiment, the fining agent further includes at least one multivalent metal oxide that acts as a source of oxygen to the melt and, optionally, an oxidizer. These multivalent metal oxides are reduced in the glass melt, releasing oxygen, which may also form bubbles. Non-limiting examples of such oxides include, but are not limited to, tin (IV) oxide (SnO$_2$), ceria or cerium oxide (CeO$_2$), and the like. The fining agent, in one embodiment, comprises up to 0.5 mol % SnO$_2$, up to 0.5 mol % CeO$_2$, and, optionally, 0-4 mol % of oxidizer.

Oxidizers such as, but not limited to, aluminum nitrate, alkali metal nitrates, alkali earth metal nitrates, zirconium nitrate, ammonium nitrate, and the like re-oxidize the multivalent metal oxides in the melt, thus enhancing the effectiveness of the fining agent. Rather than be consumed by tramp contaminants and organic compounds, the oxygen produced by the reduction of multivalent metal oxides such as tin(IV) oxide and ceria are absorbed by the oxidizer and reused in the fining process.

The fining agents described herein are "batched in" with the rest of the raw materials that are used to formulate the silicate glass. The inorganic compounds that are added as sources of water, such as the hydrates and hydroxides, upon release of water, form oxides that account for a portion of the glass composition.

The source of water decomposes to release water, which is first dissolved in the initial melt and later comes out of solution and vaporizes into the melt as steam (water vapor). The steam is captured by bubbles that are generated by impurities and already exist in the melt. The steam fills these existing bubbles, causing them to expand and increase in size. The larger bubbles rise more quickly to the top surface of the melt and escape the melt. Each mole of aluminum hydroxide, for example, decomposes in the melt to first form boehmite, which then decomposes to form alumina (aluminum oxide), ultimately releasing 1.5 moles of water according to the reactions $$Al(OH)_3 \rightarrow AlO.(OH) + H_2O, \text{ and}$$

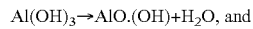

$$AlO.(OH) \rightarrow 1/2 Al_2O_3 + 1/2 H_2O.$$

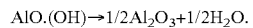

Expressed in terms of the amount of alumina that is initially introduced, or batched, into the glass as aluminum hydroxide, each mole of Al$_2$O$_3$ that is batched provides 3 moles of water vapor to the melt. Given that 1 mole of any gas occupies 22.4 liters at standard temperature and pressure (1 kPa (1 bar) pressure, 273 K), or STP, each mole of Al$_2$O$_3$ batched as Al(OH)$_3$ (molecular weight 156 grams) releases 67 liters of gas. Because the gas is released at the temperature of the melt, the actual volume of gas released by each mole of alumina batched as Al(OH)$_3$ will be much greater than 67 liters. At 1000° C. (1273 K), for example, each mole of alumina batched as Al(OH)$_3$ releases a volume of about 312 liters of gaseous water.

Similarly, a mole of sodium hydroxide decomposes to form sodium oxide and water vapor according to the reaction $$NaOH \rightarrow 1/2 Na_2O + 1/2 H_2O.$$

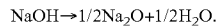

The amount Na$_2$O batched as sodium hydroxide provides one mole of water vapor to the melt. At STP, one mole of a gas has a volume of 22.4 liters. As previously described above, gaseous water is released at the temperature of the melt, and the actual volume of gas released by each mole of sodium oxide batched as NaOH will be much greater than 22.3 liters.

In one embodiment, at least 1 mole of water per kilogram of glass is used to effectively "fine" the glass—i.e., reduce the number of seeds or bubbles in the glass. In another embodiment, 5-50 moles H$_2$O/kg of glass are used to fine the glass. The amount of water needed to fine the glass depends in part on the density of the glass and other factors, such as the composition of the glass and the viscosity and temperature of the melt. Depending on the parameters for a particular glass, it may be possible in some instances to use less than 1 mole H$_2$O/kg glass to effectively fine the glass.

The fining agents described herein are capable of providing at least 0.25 moles, and, in one embodiment, 0.5 moles of gas (water vapor, oxygen, or the like) per mole of fining agent to the melt. The fining agents are capable of producing a seed concentration within the silicate glass of less than about 1 seed/cm$^3$ or, alternatively, about 5 seeds per pound (454 grams) of silicate glass. In one embodiment, the fining agents described herein are capable of producing a silicate glass that is substantially free of seeds.

The fining agents described herein may also act as "fugitive" fluxes that reduce the viscosity of the melt, causing the bubbles to rise to the top of the melt more rapidly.

A silicate glass having a seed concentration of less than about 1 seed/cm$^3$ or, alternatively, about 5 seeds per pound (454 grams) of silicate glass, is also provided. In one embodiment, the silicate glass is substantially free of seeds. At least one of the fining agents described hereinabove is added to a batch comprising raw materials for the silicate glass. Such raw materials for making the silicate glasses described herein are known in the art. After adding the at least one fining agent to the batch, the batch is melted. The fining agent comprises at least one inorganic compound that acts as of a source of water at a temperature of a melt. The silicate glass may be one of a soda lime glass, a borosilicate glass, an aluminosilicate glass, and combinations thereof, such as, for example an aluminoborosilicate glass.

In one embodiment, the silicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-10 mol % CaO; 0-5 mol % $ZrO_2$; 0-1 mol % $SnO_2$; 0-1 mol % $CeO_2$, wherein 12 mol %$\leq Li_2O+Na_2O+K_2O\leq$20 mol % and 0 mol %$\leq$MgO+CaO$\leq$10 mol %. In another embodiment, the silicate glass comprises: 63.5-66.5 mol % $SiO_2$; 8-12 mol % $Al_2O_3$; 0-3 mol % $B_2O_3$; 0-5 mol % $Li_2O$; 8-18 mol % $Na_2O$; 0-5 mol % $K_2O$; 1-7 mol % MgO; 0-2.5 mol % CaO; 0-3 mol % $ZrO_2$; 0.05-0.25 mol % $SnO_2$; 0.05-0.5 mol % $CeO_2$, wherein 14 mol %$\leq Li_2O+Na_2O+K_2O\leq$18 mol % and 2 mol %$\leq$MgO+CaO$\leq$7 mol %. In some embodiments, the silicate glass comprises up to 8 mol % MgO.

The largest single constituent of the silicate glass is $SiO_2$, which forms the matrix of the glass and is present in the inventive glasses in a concentration ranging from about 60 mol % up to and including about 70 mol %. $SiO_2$ serves as a viscosity enhancer that aids formability and imparts chemical durability to the glass. At concentrations that are higher than the range given above, $SiO_2$ prohibitively raises the melting temperature. Glass durability suffers at concentrations below the 60-70 mol % $SiO_2$ range. In addition, lower $SiO_2$ concentrations can cause the liquidus temperature to increase substantially in glasses having high alkali or alkali earth oxide concentrations.

The greater alkali metal oxide content of the silicate glass facilitates melting, softens the glass, enables ion exchange, decreases melt resistivity, and breaks up the glass network, which increases thermal expansion and decreases durability. Mixtures of alkali metal oxides help depress the liquidus temperature and may enhance ion exchange as well. While $Li_2O$ provides fast ion exchange, low density, and high modulus, it is also quite expensive. $Na_2O$ is very desirable for ion exchange with $K^+$ ions for chemical strengthening and makes stable glasses with respect to devitrification. Small amounts of $K_2O$ relative to $Na_2O$ actually help increase the rate exchange of $K^+$ ions for $Na^+$ ions and decrease the liquidus temperature, but also increase the thermal expansivity of the glass.

Alumina ($Al_2O_3$) and, to a lesser extent, zirconia ($ZrO_2$) have the opposite effect of the alkali metal oxides. In addition, $Al_2O_3$ scavenges non-bridging oxygens (NBOs) to form $AlO_4$ tetrahedra while making the glass thermally harder. Alumina and zirconia also provide lower expansion and greater durability but, at high concentrations, make the glass more difficult to melt. In most ion exchangeable glasses, $R_2O>Al_2O_3$ (where $R_2O$ represents at least one alkali metal oxide, such as $Li_2O$, $Na_2O$, $K_2O$) since glasses in which $R_2O=Al_2O_3$ are very difficult to melt unless $B_2O_3$ is present.

Alkaline earth oxides help create a steeper viscosity curve for the glasses. Replacing alkali metal oxides with alkaline earth metal oxides generally raises the anneal and strain points of the glass while lowering the melting temperatures needed to make high quality glass. MgO and CaO are less expensive than SrO and BaO and do not increase the density as much as the heavier oxides. BaO is also considered to be a hazardous or toxic material, and its presence is therefore undesirable. Accordingly, in one embodiment, the glass is substantially free of barium. Large amounts of MgO tend to increase the liquidus temperature, as the oxide is prone to form forsterite ($Mg_2SiO_4$) at low MgO concentrations in sodium aluminosilicate glasses. Accordingly, in some embodiments, the silicate glass described herein comprises 0-8 mol % MgO.

$B_2O_3$ may be used as a flux to soften glasses, making them easier to melt. $B_2O_3$ also helps scavenge non-bridging oxygen atoms (NBOs), converting the NBOs to bridging oxygen atoms through the formation of $BO_4$ tetrahedra, which increases the toughness of the glass by minimizing the number of weak NBOs. $B_2O_3$ also lowers the hardness of the glass which, when coupled with the higher toughness, decreases the brittleness, thereby resulting in a mechanically durable glass.

Arsenic and antimony are widely regarded as hazardous or toxic materials, and their presence is therefore undesirable. Accordingly, the silicate glass, in another embodiment, is substantially free of at least one of arsenic, antimony, and barium. In other embodiments, the silicate glasses described herein comprise less that 50 ppm by weight of either $As_2O_3$ or $Sb_2O_3$; i.e., these compounds are not intentionally added to the glass or glass raw materials during any of the processing steps leading up to the formation of the silicate glasses described herein.

In one embodiment, the silicate glass has a liquidus viscosity of at least 100 kilopoise (kpoise). In another embodiment, the liquidus viscosity is at least 160 kpoise, and, in a third embodiment, the liquidus viscosity is at least 220 kpoise. As used herein, the term "liquidus viscosity" refers to the viscosity of a molten glass at the liquidus temperature, wherein the liquidus temperature refers to the temperature at which the very last crystals melt away as temperature is increased from room temperature. These properties permit these silicate glasses to be down-drawable; i.e., the glass is capable of being formed into sheets using down-draw methods such as, but not limited to, fusion draw and slot draw methods that are known to those skilled in the art. Such down-draw processes are used in the large-scale manufacture of ion-exchangeable flat glass.

The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties of the glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet therethrough and into an annealing region. Compared to the fusion draw process, the slot draw process provides a thinner sheet, as only a single sheet is drawn through the slot, rather than two sheets being fused together, as in the fusion down-draw process.

Down-draw processes produce surfaces that are relatively pristine. Because the strength of the glass surface is controlled by the amount and size of surface flaws, a pristine surface that has had minimal contact has a higher initial strength. When this high strength glass is then chemically strengthened, the resultant strength is higher than that of a surface that has been a lapped and polished. Chemical strengthening or tempering by ion exchange also increases the resistance of the glass to flaw formation due to handling. Down-drawn glass may be drawn to a thickness of less than about 2 mm. In addition, down drawn glass has a very flat, smooth surface that can be used in its final application without costly grinding and polishing.

In one embodiment, the silicate glass described herein is substantially free of lithium. As used herein, "substantially free of lithium" means that lithium is not intentionally added to the glass or glass raw materials during any of the processing steps leading to the formation of the alkali aluminosilicate glass. It is understood that a silicate glass or a silicate glass article that is substantially free of lithium may inadvertently contain small amounts of lithium due to contamination. The absence of lithium reduces poisoning of ion exchange baths, and thus reduces the need to replenish the salt supply needed to chemically strengthen the glass. In addition, due to the absence of lithium, the glass is compatible with continuous unit (CU) melting technologies such as the down-draw processes described above and the materials used therein, the latter including both fused zirconia and alumina refractories and zirconia and alumina isopipes.

In one embodiment, the silicate glass comprises at least one alkali metal oxide and is ion exchangeable. As used herein, the term "ion-exchangeable" is understood to mean that the glass is capable of being strengthened by ion exchange processes that are known to those skilled in the art. Such ion exchange processes include, but are not limited to, treating the heated alkali aluminosilicate glass with a heated solution containing ions having a larger ionic radius than ions that are present in the glass surface, thus replacing the smaller ions with the larger ions. Potassium ions, for example, could replace sodium ions in the glass. Alternatively, other alkali metal ions having larger atomic radii, such as rubidium or cesium, could replace smaller alkali metal ions in the glass. Alternatively, the smaller alkali metal ions could be replaced by $Ag^+$ ions. Similarly, other alkali metal salts such as, but not limited to, sulfates, halides, and the like may be used in the ion exchange process. In one embodiment, the down-drawn glass is chemically strengthened by placing it a molten salt bath comprising $KNO_3$ for a predetermined time period to achieve ion exchange. In one embodiment, the temperature of the molten salt bath is about 430° C. and the predetermined time period is about eight hours.

Surface compressive stress refers to a stress caused by the substitution during chemical strengthening of an alkali metal ion contained in a glass surface layer by another alkali metal ion having a larger ionic radius. In one embodiment, potassium ions are substituted for sodium ions in the surface layer of the glass described herein. The glass has a surface compressive stress of at least about 200 MPa. In one embodiment, the surface compressive stress is at least about 600 MPa. The alkali aluminosilicate glass has a compressive stress layer that has a depth of at least about 30 μm and, in another embodiment, the depth of the compressive stress layer is at least about 40 μm.

The replacement of smaller ions by larger ions at a temperature below that at which the glass network can relax produces a distribution of ions across the surface of the glass that results in a stress profile. The larger volume of the incoming ion produces compressive stress (CS) on the surface and tension in the center (central tension, or CT) of the glass. The compressive stress is related to the central tension by the following relationship:

$$CS = CT \times (t - 2DOL)/DOL;$$

where t is the thickness of the glass and DOL is the depth of exchange, also referred to as depth of layer.

The silicate glasses described herein are resistant to both chipping and scratching, making it well suited for use in cover plates, touch screens, watch crystals, solar concentrators, windows, screens, containers, and other applications that require strong and tough glass with good scratch resistance.

A method of reducing the concentration of seeds in a silicate glass is also provided. A batch comprising raw materials for the silicate glass and at least one fining agent, as described herein, is first provided. Such raw materials include, but are not limited to, sand, alumina, nepheline syenite (a mineral comprising $Na_2O.Al_2O_3.2SiO_2$), boric acid, soda ash, potassium carbonate, magnesia, limestone, and the like. The batch containing the at least one fining agent is then melted to form a silicate glass melt. The fining agent comprises at least one inorganic compound that acts as of a source of water at the temperature of the melt. In one embodiment, the fining agent comprises at least one of a metal hydrate, a metal hydroxide, and combinations thereof. In another embodiment, the fining agent may further include at least one multivalent metal oxide that acts as a source of oxygen to the melt and, optionally, at least one oxidizer, all of which have been previously described herein.

As previously described herein, the inorganic compound that acts as source of water at the temperature of the melt may decompose below the temperature of the melt, generating water vapor that is initially dissolved in the solid or melt. As temperature increases the water vapor (steam) comes out of solution. The water vapor is captured by bubbles that already exist in the melt. The water vapor fills these existing bubbles, causing them to expand and increase in size. The expanded bubbles rise more quickly to the top surface of the melt and escape the melt. At least a portion of the expanded bubbles are then removed from the melt, usually by allowing them to rise to the surface of the melt, where the gases in the bubbles escape into the atmosphere above the melt and the seed concentration in the resulting silicate glass is reduced to a concentration below a predetermined level. In one embodiment, the bubbles are allowed to rise and the gases allowed to escape by maintaining the temperature of the melt at or above a predetermined temperature. For example, some aluminosilicate glasses are first melted at about 1525° C. and then heated to about 1600° C. to allow gases to escape from the melt.

A method of making the silicate glasses described herein is also provided. A batch comprising raw materials for a silicate glass and at least one fining agent, as described herein, is first provided. Such raw materials include, but are not limited to, sand, alumina, nepheline syenite (a mineral comprising $Na_2O.Al_2O_3.2SiO_2$), boric acid, soda ash, potassium carbonate, magnesia, limestone, and the like. The batch containing the at least one fining agent is then heated to a temperature at which a melt begins to form. The fining agent comprises at least one inorganic compound that acts as of a source of water at the temperature of the melt. In one embodiment, the fining agent comprises at least one of a metal hydrate and a metal hydroxide. In another embodiment, the fining agent may further include at least one multivalent metal oxide that acts as a source of oxygen to the melt and, optionally, at least one oxidizer, all of which have been previously described herein.

As previously described herein, the inorganic compound that acts as source of water at the temperature of the melt may decompose below the temperature of the melt, generating water vapor that is initially dissolved in the solid or melt. As temperature increases, the water vapor (steam) comes out of solution. The water vapor is captured by bubbles that already exist in the melt. The water vapor fills these existing bubbles, causing them to expand and increase in size. The expanded bubbles rise more quickly to the top surface of the melt and escape the melt. At least a portion of the expanded bubbles are then removed from the melt, usually by allowing them to rise to the surface of the melt where the gases in the bubbles escape into the atmosphere above the melt, thus reducing the concentration of bubbles or seeds in the melt to a concentration below a predetermined level. In one embodiment, the bubbles are allowed to rise and the vapors allowed to escape by maintaining the temperature of the melt above a predetermined temperature. The silicate glass, having a seed concentration of less than about 1 seed/cm$^3$, is then solidified.

EXAMPLES

The following examples illustrate the features and advantages of the invention and in no way are intended to limit the disclosure and appended claims thereto.

Example 1

Example 1 serves to illustrate the effectiveness of the fining agents described herein. Nine samples of aluminosilicate crucible melts were prepared. The batch materials used for each sample are listed in Table 1a. Different combinations of the fining agents of the present invention were added to samples 11-18. Sample 19 did not contain any of the fining agents described hereinabove, and thus served as a control sample. In samples 12, 13, 14, and 18, the fining agent aluminum hydroxide (Al(OH)$_3$) was substituted for alumina (Al$_2$O$_3$) in the batch. Sodium hydroxide (NaOH) was substituted for soda ash in samples 15 and 16. Ceria and tin(IV) oxide were added to samples 11-18, and the oxidizer sodium nitrate (NaNO$_3$) was added to samples 17 and 18.

The batched samples were melted at 1525° C. for one hour and then heated at 1600° C. for one hour to facilitate the removal of bubbles from the melt. The compositions of the resulting glasses, expressed in weight percent and mole percent, are listed in Tables 1b and 1c, respectively. Tables 1b and 1c also include the averages concentration of seeds or bubbles in the glass samples, expressed as seeds/cm$^3$.

As previously described herein, upon the release of water, the inorganic compound fining agents, such as the hydrates and hydroxides that are added as sources of water, form oxides that account for a portion of the glass composition. This is shown in tables 1c, 2c, and 3c.

Polished cross-sections of glasses obtained from the melts in Example 1 are shown in FIG. 1. Sample 19, which contained none of the fining agents, has an average seed concentration of 930 seeds/cm$^3$. The addition of 0.1 mol % SnO$_2$ and 0.1 mol % CeO$_2$ alone (sample 11) drastically reduces the concentration of seeds or bubbles in the glass to 79.1 seeds/cm$^3$. The use of the oxidizer (NaNO$_3$) with SnO$_2$ and CeO$_2$ alone (sample 17) also further reduces the concentration of bubbles or seeds to 0.061 seeds/cm$^3$.

The addition of either Al(OH)$_3$ (samples 12, 13, 14, 18), or NaOH (samples 15 and 16) adds water in the form of hydroxides. Either of these fining agents reduces the seed concentration to levels below those observed when a combination of tin(IV) oxide and ceria alone (sample 11) is used, whereas addition of even higher levels of these hydroxides virtually eliminate seeds or bubbles under the melting conditions used. The addition of Al(OH)$_3$ reduces the seed concentration to values ranging from 0.610 seeds/cm$^3$ (sample 14, in which 359 g of nephelene syenite were added to the batch) to 0.183 seeds/cm$^3$ (sample 18, in which 247 g (Al(OH)$_3$ were added to the batch). The addition of NaOH reduces seed concentration to values ranging from 0.580 seeds/cm$^3$ (sample 15, 87 g NaOH added to the batch) to 0.677 seeds/cm$^3$ (sample 16, 173 g NaOH added to the batch). Use of the oxidizer NaNO$_3$ with SnO$_2$, CeO$_2$, and a hydrate (sample 18) reduces the number of bubble/seeds in the glass to a concentration of 0.183 seeds/cm$^3$.

Example 2

Example 2 illustrates the amount of fining agent (or agents) that effectively reduce the concentration of bubbles/seeds in silicate glasses. Nine samples of aluminosilicate crucible melts were prepared. The batch materials used for each sample are listed in Table 2a. Ceria and tin(IV) oxide were added to samples 21-29, and are the only fining agents present in sample 29. The fining agent aluminum hydroxide (Al(OH)$_3$) was substituted for alumina (Al$_2$O$_3$) in the batch in samples 21 and 22, and sodium hydroxide (NaOH) was substituted for soda ash in samples 23 and 24. Samples 21 and 23 each contain an amount of hydroxide fining agent (Al(OH)$_3$ in sample 21 and NaOH in sample 23) to generate three moles of H$_2$O, whereas samples 22 and 24 each contain an amount of hydroxide fining agent ((Al(OH)$_3$) in sample 21 and NaOH in sample 23) to generate six moles of H$_2$O. Sodium nitrate was added as an oxidizer to samples 27 and 28.

Varying amounts of tall oil, an organic fatty acid, were added to samples 25 and 26. Tall oil burns at melt temperatures, consuming O$_2$ to yield CO, CO$_2$, and water as combustion products.

The batched samples were melted at 1525° C. for one hour and then heated at 1600° C. for one hour to facilitate the removal of bubbles from the melt. The compositions of the resulting glasses, expressed in weight percent and mole percent, are listed in Tables 2b and 2c, respectively.

Figure 2:
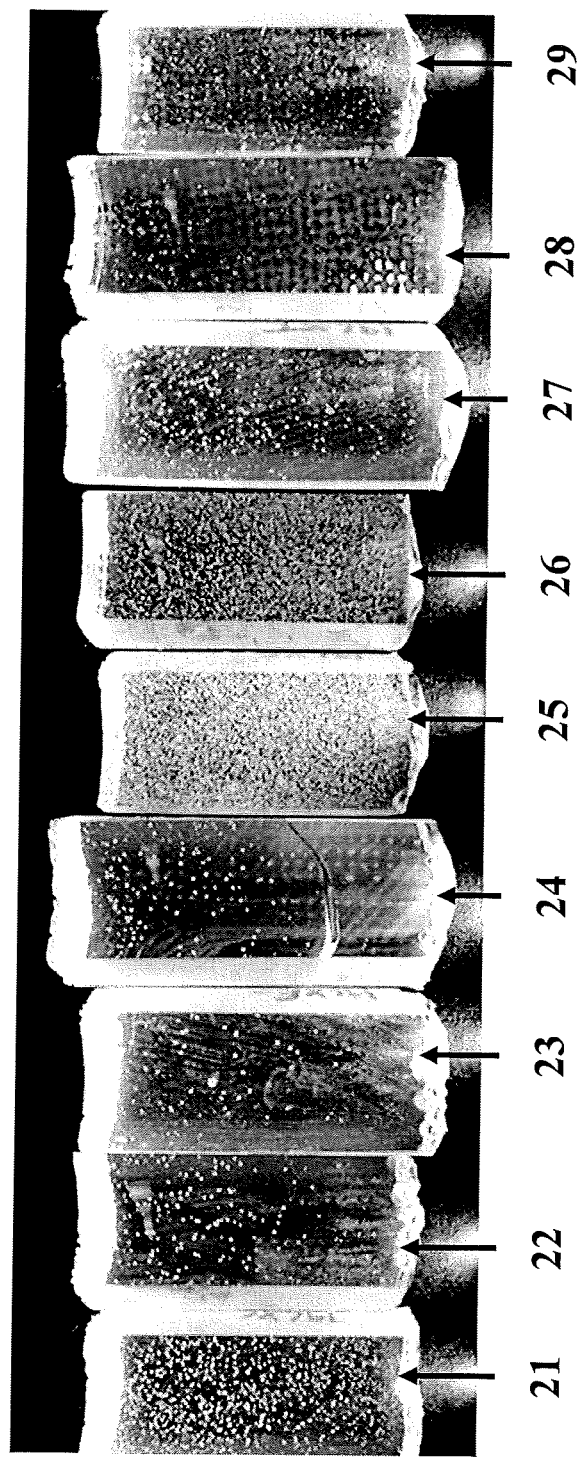
FIG. 2 is a photograph of polished cross sections of glasses obtained from melts showing the effect of different fining agents on the concentration of seeds within the melt.

Polished cross-sections of glasses obtained from the melts in Example 2 are shown in FIG. 2. Both aluminum hydroxide and sodium hydroxide fining agents effectively fine the glass. For a given amount of water generated by the fining agents (i.e., comparing sample 21 vs. sample 23 and sample 22 vs. sample 24), NaOH appears to be more effective than Al(OH)$_3$ in reducing the bubble/seed count in the glass.

Based on these experiments, tall oil does not act as a fining agent. Instead, as seen in samples 25 and 25 in FIG. 2, the addition of tall oil to the melt leads to an increase bubble/seed formation in the glass.

Example 3

Example 3 compares the effectiveness of the hydroxide fining agents to hydrogen permeation. The batch materials used for each sample are listed in Table 3a.

Samples 31 and 32 were identical samples, each containing aluminum hydroxide, tin(IV) oxide, and ceria. Samples 31 and 32 were placed in platinum crucibles. Sample 32 was melted with glass on both sides of the crucible to effectively shut off hydrogen permeation into the sample. Sample 32 was further contained by a second refractory crucible backer.

Samples 33 and 34 were identical samples, containing tin(IV) oxide, ceria, and 52.78 g of sodium nitrate oxidizer. Sample 33 was melted with glass on both sides of the crucible to effectively shut off hydrogen permeation into the sample. Samples 35, 36, and 37 contained $SnO_2$, $CeO_2$, and 26.39, 105.55 g, and 52.78 g, respectively, of $NaNO_3$. Sample 38 contained $SnO_2$ and $NaNO_3$, but no ceria, whereas sample 9 contained ceria and $NaNO_3$, but no tin(IV) oxide.

The batched samples were melted at 1525° C. for one hour and then heated at 1600° for one hour to facilitate the removal of bubbles from the melt. The compositions of the resulting glasses, expressed in weight percent and mole percent, are listed in Tables 3b and 3c, respectively.

Figure 3:
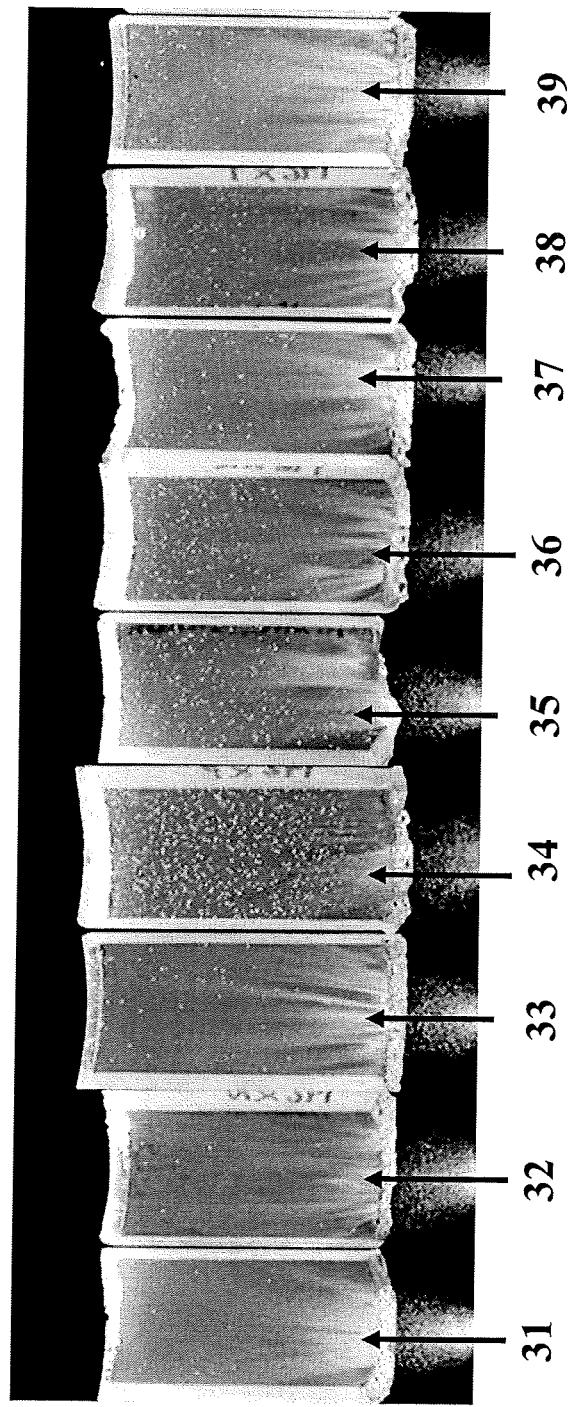
FIG. 3 is a photograph of polished cross sections of glasses obtained from melts comparing the effectiveness of hydroxide fining agents in reducing seed formation.

Polished cross-sections of glasses obtained from the melts in Example 3 are shown in FIG. 3. Comparison of samples 31 and 32 shows no apparent difference in the number of bubbles/seeds, indicating the hydrogen permeation is not the mechanism for fining/bubble reduction in the melt.

Samples 33 and 34 do not contain hydride fining agents. In this case, the glass where $H_2$ permeation was shut off (sample 33) has fewer bubbles, again showing that $H_2$ permeation is not the effective mechanism of the fining package of the present invention.

Samples 35-37 demonstrate that varying the amount of oxidizer has little effect on the number of bubbles/seeds in the melt. These samples all exhibit low concentrations of bubbles/seeds, compared to glasses that do not contain the fining agents described herein (see, for example, sample 39 in FIG. 1). Similarly, melts containing oxidizer and either tin (IV) oxide alone (sample 38) or ceria alone (sample 39) yield low concentrations of bubbles/seeds, showing that the presence of just one of these fining agents and an oxidizer is still effective in removing bubbles/seeds.

Example 4

Example 4 identified fining agent or agents that effectively reduces the concentration of bubbles/seeds in soda lime glasses. Nine samples of soda lime crucible melts were prepared. The batch materials used for each sample are listed in Table 4a.

The batched samples were melted at 1425° C. for one hour and then heated at 1525° C. for one hour to facilitate the removal of bubbles from the melt. The compositions of the resulting glasses, expressed in weight percent and mole percent, are listed in Tables 4b and 4c, respectively.

Sample 41, which contained no fining agent or oxidizer, had numerous seeds. A substantial reduction in seed concentration was observed in sample 48, in which talc and tin(IV) oxide were added to the batch. Lesser reductions in seed concentration was observed in samples 42 (containing only one fining agent: tin(IV) oxide); 43 (containing tin(IV) oxide and sodium nitate oxidizer); 44 (containing only one fining agent: NaOH); 45 (containing tin(IV) oxide and NaOH); 46 (containing tin(IV) oxide, NaOH and sodium nitrate); 47 (containing tin(IV) oxide and calcium hydroxide); and 49 (containing tin(IV) oxide and sodium sulfate oxidizer).

Example 5

Example 5 identified fining agent or agents that effectively reduces the concentration of bubbles/seeds in aluminosilicate glasses that are used in liquid crystal display (LCD) applications. Nine samples of aluminosilicate crucible melts were prepared. The batch materials used for each sample are listed in Table 5a.

The batched samples were melted at 1550° C. for one hour and then heated at 1625° C. for one hour to facilitate the removal of bubbles from the melt. The compositions of the resulting glasses, expressed in weight percent and mole percent, are listed in Tables 5b and 5c, respectively.

Very few seeds were observed in sample 54, in which fining agents aluminum hydroxide and tin(IV) oxide, and barium nitrate oxidizer were added to the batch. A substantial reduction in seed concentration was observed for samples 52 (containing tin(IV) oxide and half the amount of aluminum hydroxide in sample 54) a; 53 (containing tin(IV) oxide and the same amount of aluminum hydroxide as in sample 54); and 57 (containing sodium hydroxide, the same amount of aluminum hydroxide as in sample 54, and barium nitrate oxidizer). The reduction in seed concentration observed in samples 51 and 58 (both containing tin(IV) oxide and barium nitrate oxidizer) was less than that observed in samples 54, 52, 53, and 57, but still significant. No reduction in seed concentration was observed in samples 55 (containing twice the tin(IV) oxide concentration of samples 51-54 and 57-59, and barium nitrate) and 56 ((containing three times the tin (IV) oxide concentration of samples 51-54 and 57-59, and barium nitrate oxidizer).

Example 6

Example 6 identified fining agent or agents that effectively reduces the concentration of bubbles/seeds in aluminosilicate glasses having high boron concentrations. First and second sets of samples of crucible melts were prepared. The batch materials used for each of the first and second set of samples are listed in Table 5a1, respectively.

The first set of batched samples was melted at 1525° C. for one hour and then heated at 1625° C. for one hour to facilitate the removal of bubbles from the melt. The compositions of the resulting glasses, expressed in weight percent and mole percent, are listed in Tables 5b1 and 5c1, respectively. The second set of batched samples was melted at 1529° C. for one hour and then heated at 1625° C. for one hour to facilitate the removal of bubbles from the melt. The compositions of the resulting glasses, expressed in weight percent and mole percent, are listed in Tables 5b2 and 5c2, respectively.

Samples 63 and 64 were substantially free of seeds. The batch material for sample 3 included fining agents tin(IV) oxide and hydrated alumina, whereas the batch material for sample 64 comprised fining agents arsenic pentoxide, tin(IV) oxide, and sodium nitrate as an oxidizer. The results obtained for samples 63 and 64 show that the addition of water (in the form of hydrated alumina) and tin(IV) oxide works as effectively as arsenic. A substantial reduction in seed concentration was also observed for samples 61 and 62, in which the batch materials included water (in the form of hydrated alumina) as the sole fining agent. The results obtained for samples 61 and 62 indicate that water-containing hydrates can effectively act as fining agents for glasses over a range of boron contents.

Substantial reduction in seed count were also observed for samples 65 and 66. Fining agents added to the batch materials for sample 65 included hydrated alumina, cerium oxide, and tin(IV) oxide. Fining agents added to the batch materials for sample 66 included hydrated alumina, sodium hydroxide, cerium oxide, and tin(IV) oxide. The results obtained for these samples also demonstrate the efficacy of water in the form of hydrated alumina as a fining agent for boron-containing glasses.

While typical embodiments have been set forth for the purpose of illustration, the foregoing description should not be deemed to be a limitation on the scope of the above disclosure and appended claims. Accordingly, various modifications, adaptations, and alternatives may occur to one skilled in the art without departing from the spirit and scope of the present disclosure.

TABLE 1a

Compositions of batch materials, expressed in grams, for crucible melts described in Example 1.

| Batch Material | 11 | 12 | 13 | 14 | 15 | 16 | 17 | 18 | 19 |
|---|---|---|---|---|---|---|---|---|---|
| Sand | 616.56 | 616.57 | 616.59 | 396.99 | 616.57 | 616.58 | 616.56 | 616.59 | 619.67 |
| Alumina | 161.71 | 82.33 | 0 | 0 | 161.71 | 161.71 | 161.71 | 0 | 162.51 |
| Aluminum hydroxide | 0.00 | 121.40 | 247.30 | 120.15 | 0.00 | 0.00 | 0.00 | 247.30 | 0.00 |
| Nepheline Syenite | 0.00 | 0.00 | 0.00 | 359.48 | 0.00 | 0.00 | 0.00 | 0.00 | 0.00 |
| Boric Acid | 12.06 | 12.06 | 12.06 | 12.06 | 12.06 | 12.06 | 12.06 | 12.06 | 12.06 |
| Soda Ash | 227.86 | 227.84 | 227.81 | 165.45 | 112.69 | 0 | 194.96 | 194.90 | 228.89 |
| Sodium Hydroxide | 0.00 | 0.00 | 0.00 | 0.00 | 87.27 | 172.67 | 0.00 | 0.00 | 0.00 |
| Sodium Nitrate | 0.00 | 0.00 | 0.00 | 0.00 | 0.00 | 0.00 | 52.78 | 52.78 | 0.00 |
| Potassium Carbonate | 52.69 | 52.69 | 52.69 | 27.29 | 52.69 | 52.69 | 52.66 | 52.66 | 52.98 |
| Magnesia | 37.86 | 37.86 | 37.86 | 37.92 | 37.87 | 37.87 | 37.86 | 37.86 | 38.07 |
| Limestone | 8.23 | 8.23 | 8.23 | 6.30 | 8.50 | 8.77 | 8.31 | 8.31 | 8.23 |
| Tin (IV) Oxide | 2.31 | 2.31 | 2.31 | 2.31 | 2.31 | 2.31 | 2.31 | 2.31 | 0.00 |
| Cerium (IV) Oxide | 2.72 | 2.72 | 2.72 | 2.72 | 2.72 | 2.72 | 2.72 | 2.72 | 0.00 |

TABLE 1b

Compositions of glasses prepared from crucible melts described in Example 1, expressed in weight percent.

| Composition (wt %) | 11 | 12 | 13 | 14 | 15 | 16 | 17 | 18 | 19 |
|---|---|---|---|---|---|---|---|---|---|
| $SiO_2$ | 61.37 | 61.37 | 61.38 | 61.38 | 61.37 | 61.37 | 61.37 | 61.37 | 61.69 |
| $Al_2O_3$ | 16.23 | 16.24 | 16.24 | 16.24 | 16.23 | 16.23 | 16.23 | 16.23 | 16.32 |
| $B_2O_3$ | 0.68 | 0.68 | 0.68 | 0.68 | 0.68 | 0.68 | 0.68 | 0.68 | 0.68 |
| $Na_2O$ | 13.33 | 13.33 | 13.33 | 13.33 | 13.33 | 13.33 | 13.33 | 13.33 | 13.39 |
| $K_2O$ | 3.57 | 3.57 | 3.57 | 3.57 | 3.57 | 3.57 | 3.57 | 3.57 | 3.59 |
| MgO | 3.66 | 3.66 | 3.66 | 3.66 | 3.66 | 3.66 | 3.66 | 3.66 | 3.68 |
| CaO | 0.50 | 0.50 | 0.50 | 0.50 | 0.50 | 0.50 | 0.50 | 0.50 | 0.50 |
| $SnO_2$ | 0.23 | 0.23 | 0.23 | 0.23 | 0.23 | 0.23 | 0.23 | 0.23 | 0.00 |
| $CeO_2$ | 0.27 | 0.27 | 0.27 | 0.27 | 0.27 | 0.27 | 0.27 | 0.27 | 0.00 |
| $Fe_2O_3$ | 0.02 | 0.02 | 0.01 | 0.01 | 0.02 | 0.02 | 0.02 | 0.01 | 0.02 |
| Average seeds/$cm^3$ | 79.11 | 0.482 | 0.384 | 0.610 | 0.580 | 0.677 | 0.061 | 0.183 | 929.7 |

TABLE 1c

Compositions of glasses prepared from crucible melts described in Example 1, expressed in mole percent.

| Composition (mol %) | 11 | 12 | 13 | 14 | 15 | 16 | 17 | 18 | 19 |
|---|---|---|---|---|---|---|---|---|---|
| $SiO_2$ | 65.89 | 65.89 | 65.89 | 65.89 | 65.89 | 65.89 | 65.89 | 65.89 | 65.89 |
| $Al_2O_3$ (Alumina) | 10.27 | 5.27 | 0 | 0 | 10.27 | 10.27 | 10.27 | 0 | 10.27 |
| $Al_2O_3$ (Al(OH)$_3$) | 0 | 5 | 10.27 | 5 | 0 | 0 | 0 | 10.27 | 0 |
| $Al_2O_3$ (Nepheline) | 0 | 0 | 0 | 5.27 | 0 | 0 | 0 | 0 | 0 |
| $B_2O_3$ | 0.63 | 0.63 | 0.63 | 0.63 | 0.63 | 0.63 | 0.63 | 0.63 | 0.63 |
| $Na_2O$ (Soda Ash) | 13.91 | 13.91 | 13.91 | 13.91 | 6.91 | 0 | 11.91 | 11.91 | 13.91 |
| $Na_2O$ (NaOH) | 0 | 0 | 0 | 0 | 7 | 13.91 | 0 | 0 | 0 |
| $Na_2O$ (NaNO$_3$) | 0 | 0 | 0 | 0 | 0 | 0 | 2 | 2 | 0 |
| $K_2O$ | 2.45 | 2.45 | 2.45 | 2.45 | 2.45 | 2.45 | 2.45 | 2.45 | 2.45 |
| MgO | 5.86 | 5.86 | 5.86 | 5.86 | 5.86 | 5.86 | 5.86 | 5.86 | 5.86 |
| CaO | 0.57 | 0.57 | 0.57 | 0.57 | 0.57 | 0.57 | 0.57 | 0.57 | 0.57 |
| $SnO_2$ | 0.10 | 0.10 | 0.10 | 0.10 | 0.10 | 0.10 | 0.10 | 0.10 | 0 |
| $CeO_2$ | 0.10 | 0.10 | 0.10 | 0.10 | 0.10 | 0.10 | 0.10 | 0.10 | 0 |
| Average seeds/$cm^3$ | 79.11 | 0.482 | 0.384 | 0.610 | 0.580 | 0.677 | 0.061 | 0.183 | 929.7 |

TABLE 2a

Compositions of batch materials, expressed in grams, for crucible melts described in Example 2.

| Batch Material | 21 | 22 | 23 | 24 | 25 | 26 | 27 | 28 | 29 |
|---|---|---|---|---|---|---|---|---|---|
| Sand | 616.56 | 616.56 | 616.56 | 616.56 | 616.56 | 616.56 | 616.56 | 189.49 | 616.56 |
| Alumina | 145.77 | 129.94 | 161.71 | 161.71 | 161.71 | 161.71 | 161.71 | 0 | 161.71 |
| Aluminum hydroxide | 24.22 | 48.59 | 0.00 | 0.00 | 0.00 | 0.00 | 0.00 | 0.00 | 0.00 |
| Nepheline Syenite | 0.00 | 0.00 | 0.00 | 0.00 | 0.00 | 0.00 | 0.00 | 699.16 | 0.00 |
| Boric Acid | 12.06 | 12.06 | 12.06 | 12.06 | 12.06 | 12.06 | 12.06 | 12.06 | 12.06 |
| Soda Ash | 227.86 | 227.85 | 178.50 | 129.15 | 227.86 | 227.86 | 194.96 | 73.63 | 227.86 |
| Sodium Hydroxide | 0.00 | 0.00 | 37.40 | 74.81 | 0.00 | 0.00 | 0.00 | 0.00 | 0.00 |
| Sodium Nitrate | 0.00 | 0.00 | 0.00 | 0.00 | 0.00 | 0.00 | 52.78 | 52.78 | 0.00 |
| Potassium Carbonate | 52.69 | 52.69 | 52.69 | 52.69 | 52.69 | 52.69 | 52.66 | 3.27 | 52.69 |
| Magnesia | 37.86 | 37.86 | 37.86 | 37.87 | 37.86 | 37.86 | 37.86 | 37.97 | 37.86 |
| Limestone | 8.23 | 8.23 | 8.35 | 8.46 | 8.23 | 8.23 | 8.31 | 4.56 | 8.23 |
| Tin (IV) Oxide | 2.31 | 2.31 | 2.31 | 2.31 | 2.31 | 2.31 | 2.31 | 2.31 | 2.31 |
| Cerium (IV) Oxide | 2.72 | 2.72 | 2.72 | 2.72 | 2.72 | 2.72 | 2.72 | 2.72 | 2.72 |
| Fatty Acid, Tall Oil | | | | | 1.00 | 5.00 | | | |

TABLE 2b

Compositions of glasses prepared from crucible melts described in Example 2, expressed in weight percent.

| Composition (wt %) | 21 | 22 | 23 | 24 | 25 | 26 | 27 | 28 | 29 |
|---|---|---|---|---|---|---|---|---|---|
| $SiO_2$ | 61.38 | 61.37 | 61.37 | 61.37 | 61.37 | 61.37 | 61.37 | 61.38 | 61.37 |
| $Al_2O_3$ | 16.23 | 16.23 | 16.23 | 16.23 | 16.23 | 16.23 | 16.23 | 16.24 | 16.23 |
| $B_2O_3$ | 0.68 | 0.68 | 0.68 | 0.68 | 0.68 | 0.68 | 0.68 | 0.68 | 0.68 |
| $Na_2O$ | 13.33 | 13.33 | 13.33 | 13.33 | 13.33 | 13.33 | 13.33 | 13.33 | 13.33 |
| $K_2O$ | 3.58 | 3.57 | 3.57 | 3.57 | 3.57 | 3.57 | 3.57 | 3.57 | 3.57 |
| MgO | 3.66 | 3.66 | 3.66 | 3.66 | 3.66 | 3.66 | 3.66 | 3.66 | 3.66 |
| CaO | 0.50 | 0.50 | 0.50 | 0.50 | 0.50 | 0.50 | 0.50 | 0.50 | 0.50 |
| $SnO_2$ | 0.23 | 0.23 | 0.23 | 0.23 | 0.23 | 0.23 | 0.23 | 0.23 | 0.23 |
| $CeO_2$ | 0.27 | 0.27 | 0.27 | 0.27 | 0.27 | 0.27 | 0.27 | 0.27 | 0.27 |
| $Fe_2O_3$ | 0.02 | 0.02 | 0.02 | 0.02 | 0.02 | 0.02 | 0.02 | 0.00 | 0.02 |

TABLE 2c

Compositions of glasses prepared from crucible melts described in Example 2, expressed in mole percent.

| Composition (mol %) | 21 | 22 | 23 | 24 | 25 | 26 | 27 | 28 | 29 |
|---|---|---|---|---|---|---|---|---|---|
| $SiO_2$ | 65.89 | 65.89 | 65.89 | 65.89 | 65.89 | 65.89 | 65.89 | 65.89 | 65.89 |
| $Al_2O_3$ (Alumina) | 9.27 | 8.27 | 10.27 | 10.27 | 10.27 | 10.27 | 10.27 | 0 | 10.27 |
| $Al_2O_3$ (Al(OH)$_3$) | 1 | 2 | 0 | 0 | 0 | 0 | 0 | 0 | 0 |
| $Al_2O_3$ (Nepheline) | 0 | 0 | 0 | 0 | 0 | 0 | 0 | 10.27 | 0 |
| $B_2O_3$ | 0.63 | 0.63 | 0.63 | 0.63 | 0.63 | 0.63 | 0.63 | 0.63 | 0.63 |
| $Na_2O$ (Soda Ash) | 13.91 | 13.91 | 10.91 | 7.91 | 13.91 | 13.91 | 11.91 | 11.91 | 13.91 |
| $Na_2O$ (NaOH) | 0 | 0 | 3 | 6 | 0 | 0 | 0 | 0 | 0 |
| $Na_2O$ (NaNO$_3$) | 0 | 0 | 0 | 0 | 0 | 0 | 2 | 2 | 0 |
| $K_2O$ | 2.45 | 2.45 | 2.45 | 2.45 | 2.45 | 2.45 | 2.45 | 2.45 | 2.45 |
| MgO | 5.86 | 5.86 | 5.86 | 5.86 | 5.86 | 5.86 | 5.86 | 5.86 | 5.86 |
| CaO | 0.57 | 0.57 | 0.57 | 0.57 | 0.57 | 0.57 | 0.57 | 0.57 | 0.57 |
| $SnO_2$ | 0.10 | 0.10 | 0.10 | 0.10 | 0.10 | 0.10 | 0.10 | 0.10 | 0.10 |
| $CeO_2$ | 0.10 | 0.10 | 0.10 | 0.10 | 0.10 | 0.10 | 0.10 | 0.10 | 0.10 |

TABLE 3a

Compositions of batch materials, expressed in grams, for crucible melts described in Example 3.

| Batch Material | 31 | 32 | 33 | 34 | 35 | 36 | 37 | 38 | 39 |
|---|---|---|---|---|---|---|---|---|---|
| Sand | 616.59 | 616.59 | 616.56 | 616.56 | 616.56 | 616.56 | 188.45 | 616.76 | 616.36 |
| Alumina | 0 | 0 | 161.71 | 161.71 | 161.71 | 161.71 | 0 | 161.71 | 161.61 |
| Aluminum hydroxide | 247.30 | 247.30 | 0.00 | 0.00 | 0.00 | 0.00 | 0.00 | 0.00 | 0.00 |
| Nepheline Syenite | 0.00 | 0.00 | 0.00 | 0.00 | 0.00 | 0.00 | 699.16 | 0.00 | 0.00 |
| Boric Acid | 12.06 | 12.06 | 12.06 | 12.06 | 12.06 | 12.06 | 12.06 | 12.06 | 12.06 |
| Soda Ash | 227.81 | 227.81 | 194.96 | 194.96 | 211.41 | 162.05 | 73.33 | 194.97 | 194.78 |
| Sodium Nitrate | 0.00 | 0.00 | 52.78 | 52.78 | 26.39 | 105.55 | 52.78 | 52.78 | 52.78 |
| Potassium Carbonate | 52.69 | 52.69 | 52.66 | 52.67 | 52.64 | 52.66 | 3.15 | 52.66 | 52.66 |
| Magnesia | 37.86 | 37.86 | 37.86 | 37.86 | 37.86 | 37.86 | 37.97 | 37.86 | 37.86 |
| Limestone | 8.23 | 8.23 | 8.31 | 8.31 | 8.27 | 8.38 | 4.55 | 8.31 | 8.31 |
| Tin (IV) Oxide | 2.31 | 2.31 | 2.31 | 2.31 | 2.31 | 2.31 | 2.31 | 4.71 | 0.00 |
| Cerium Oxide | 2.72 | 2.72 | 2.72 | 2.72 | 2.72 | 2.72 | 2.72 | 0.00 | 5.35 |

TABLE 3b

Compositions of glasses prepared from crucible melts described in Example 3, expressed in weight percent.

| Composition (wt %) | 31 | 32 | 33 | 34 | 35 | 36 | 37 | 38 | 39 |
|---|---|---|---|---|---|---|---|---|---|
| $SiO_2$ | 61.38 | 61.38 | 61.37 | 61.37 | 61.37 | 61.37 | 61.38 | 61.40 | 61.36 |
| $Al_2O_3$ | 16.24 | 16.24 | 16.23 | 16.23 | 16.23 | 16.23 | 16.24 | 16.24 | 16.23 |
| $B_2O_3$ | 0.68 | 0.68 | 0.68 | 0.68 | 0.68 | 0.68 | 0.68 | 0.68 | 0.68 |
| $Na_2O$ | 13.33 | 13.33 | 13.33 | 13.33 | 13.33 | 13.33 | 13.33 | 13.33 | 13.32 |
| $K_2O$ | 3.57 | 3.57 | 3.57 | 3.57 | 3.57 | 3.57 | 3.57 | 3.57 | 3.57 |
| MgO | 3.66 | 3.66 | 3.66 | 3.66 | 3.66 | 3.66 | 3.66 | 3.66 | 3.66 |
| CaO | 0.50 | 0.50 | 0.50 | 0.50 | 0.50 | 0.50 | 0.50 | 0.50 | 0.50 |
| $SnO_2$ | 0.23 | 0.23 | 0.23 | 0.23 | 0.23 | 0.23 | 0.23 | 0.47 | 0.00 |
| $CeO_2$ | 0.27 | 0.27 | 0.27 | 0.27 | 0.27 | 0.27 | 0.27 | 0.00 | 0.53 |
| $Fe_2O_3$ | 0.01 | 0.01 | 0.02 | 0.02 | 0.02 | 0.02 | 0.00 | 0.02 | 0.02 |

TABLE 3c

Compositions of glasses prepared from crucible melts described in Example 3, expressed in mole percent.

| Composition (mol %) | 31 | 32 | 33 | 34 | 35 | 36 | 37 | 38 | 39 |
|---|---|---|---|---|---|---|---|---|---|
| $SiO_2$ | 65.89 | 65.89 | 65.89 | 65.89 | 65.89 | 65.89 | 65.89 | 65.89 | 65.89 |
| $Al_2O_3$ (Alumina) | 0 | 0 | 10.27 | 10.27 | 10.27 | 10.27 | 0 | 10.27 | 10.27 |
| $Al_2O_3$ (Al(OH)$_3$) | 10.27 | 10.27 | 0 | 0 | 0 | 0 | 0 | 0 | 0 |
| $Al_2O_3$ (Nepheline) | 0 | 0 | 0 | 0 | 0 | 0 | 10.27 | 0 | 0 |
| $B_2O_3$ | 0.63 | 0.63 | 0.63 | 0.63 | 0.63 | 0.63 | 0.63 | 0.63 | 0.63 |
| $Na_2O$ (Soda Ash) | 13.91 | 13.91 | 11.91 | 11.91 | 12.91 | 9.91 | 11.91 | 11.91 | 11.91 |
| $Na_2O$ (NaNO$_3$) | 0 | 0 | 2 | 2 | 1 | 4 | 2 | 2 | 2 |
| $K_2O$ | 2.45 | 2.45 | 2.45 | 2.45 | 2.45 | 2.45 | 2.45 | 2.45 | 2.45 |
| MgO | 5.86 | 5.86 | 5.86 | 5.86 | 5.86 | 5.86 | 5.86 | 5.86 | 5.86 |
| CaO | 0.57 | 0.57 | 0.57 | 0.57 | 0.57 | 0.57 | 0.57 | 0.57 | 0.57 |
| $SnO_2$ | 0.10 | 0.10 | 0.10 | 0.10 | 0.10 | 0.10 | 0.10 | 0.2 | 0 |
| $CeO_2$ | 0.10 | 0.10 | 0.10 | 0.10 | 0.10 | 0.10 | 0.10 | 0 | 0.2 |

TABLE 4a

Compositions of batch materials, expressed in grams, for crucible melts described in Example 4.

| Batch Material | 41 | 42 | 43 | 44 | 45 | 46 | 47 | 48 | 49 |
|---|---|---|---|---|---|---|---|---|---|
| Sand | 584.01 | 564.43 | 564.43 | 584.02 | 564.43 | 558.44 | 584.59 | 519.71 | 584.01 |
| Alumina | 13.55 | 13.59 | 13.58 | 13.54 | 13.58 | 13.44 | 13.67 | 13.71 | 13.55 |
| Soda Ash | 191.49 | 190.94 | 176.68 | 84.28 | 84.00 | 83.18 | 191.49 | 191.41 | 184.36 |
| Sodium Nitrate | 0.00 | 0.00 | 22.87 | 0.00 | 0.00 | 22.65 | 0.00 | 0.00 | 0.00 |
| Magnesia | 32.25 | 32.17 | 32.17 | 32.25 | 32.18 | 31.86 | 32.48 | 0 | 32.25 |
| Limestone | 104.02 | 103.88 | 103.91 | 104.28 | 104.14 | 102.96 | 0 | 104.25 | 104.03 |
| Sodium hydroxide | 0.00 | 0.00 | 0.00 | 81.25 | 81.04 | 80.21* | 0.00 | 0.00 | 0.00 |
| Lime hydrate | 0.00 | 0.00 | 0.00 | 0.00 | 0.00 | 0.00 | 94.99 | 0.00 | 0.00 |
| Talc | 0.00 | 0.00 | 0.00 | 0.00 | 0.00 | 0.00 | 0.00 | 103.47 | 0.00 |
| Tin (IV) Oxide | 0.00 | 20.00 | 20.00 | 0.00 | 20.00 | 20.00 | 0.00 | 0.00 | 0.00 |
| Sodium sulfate | 0.00 | 0.00 | 0.00 | 0.00 | 0.00 | 0.00 | 0.00 | 0.00 | 9.53 |

*CaOH substituted for NaOH

TABLE 4b

Compositions of glasses prepared from crucible melts described in Example 4, expressed in weight percent.

| Composition (wt %) | 41 | 42 | 43 | 44 | 45 | 46 | 47 | 48 | 49 |
|---|---|---|---|---|---|---|---|---|---|
| $SiO_2$ | 72.94 | 72.75 | 72.75 | 72.94 | 72.75 | 72.00 | 72.94 | 72.86 | 72.46 |
| $Al_2O_3$ | 1.89 | 1.89 | 1.89 | 1.89 | 1.89 | 1.87 | 1.89 | 1.89 | 1.88 |
| $Na_2O$ | 13.96 | 13.96 | 13.92 | 13.92 | 13.97 | 13.92 | 14.81 | 13.96 | 13.95 | 13.87 |
| MgO | 4.08 | 4.07 | 4.07 | 4.08 | 4.07 | 4.03 | 4.08 | 4.07 | 4.05 |
| CaO | 7.09 | 7.08 | 7.08 | 7.09 | 7.08 | 7.00 | 7.09 | 7.08 | 7.04 |
| $SnO_2$ | 0.00 | 0.25 | 0.25 | 0.00 | 0.25 | 0.25 | 0.00 | 0.00 | 0.00 |
| $SO_3$ | 0.00 | 0.00 | 0.00 | 0.00 | 0.00 | 0.00 | 0.00 | 0.00 | 0.67 |
| $Fe_2O_3$ | 0.04 | 0.04 | 0.04 | 0.04 | 0.04 | 0.04 | 0.05 | 0.15 | 0.04 |

TABLE 4c

Compositions of glasses prepared from crucible melts described in Example 4, expressed in mole percent.

| Composition (mol %) | 41 | 42 | 43 | 44 | 45 | 46 | 47 | 48 | 49 |
|---|---|---|---|---|---|---|---|---|---|
| $SiO_2$ | 72. | 72. | 72. | 72. | 72. | 72. | 72. | 72. | 72. |
| $Al_2O_3$ | 1.1 | 1.1 | 1.1 | 1.1 | 1.1 | 1.1 | 1.1 | 1.1 | 1.1 |
| $Na_2O$ (Soda Ash) | 13.4 | 13.4 | 12.4 | 5.9 | 5.9 | 5.9 | 13.4 | 13.4 | 12.9 |
| $Na_2O$ ($NaNO_3$) | 0 | 0 | 1 | 0 | 0 | 0 | 0 | 0 | 0 |
| MgO | 6 | 6 | 6 | 6 | 6 | 6 | 6 | 0 | 6 |
| CaO | 7.5 | 7.5 | 7.5 | 7.5 | 7.5 | 7.5 | 0 | 7.5 | 7.5 |
| $Na_2O$ | 0 | 0 | 0 | 7.5 | 7.5 | 7.5 | 0 | 0 | 0 |
| CaO | 0 | 0 | 0 | 0 | 0 | 0 | 7.5 | 0 | 0 |
| MgO | 0 | 0 | 0 | 0 | 0 | 0 | 0 | 6 | 0 |
| $SnO_2$ | 0 | 0.1 | 0.1 | 0 | 0.1 | 0.1 | 0 | 0 | 0 |
| $Na_2O$ | 0 | 0 | 0 | 0 | 0 | 0 | 0 | 0 | .5 |

TABLE 5a

Compositions of batch materials, expressed in grams, for crucible melts described in Example 5.

| Batch Material | 51 | 52 | 53 | 54 | 55 | 56 | 57 | 58 | 59 |
|---|---|---|---|---|---|---|---|---|---|
| Sand | 555.02 | 555.04 | 555.06 | 553.96 | 553.92 | 552.82 | 550.55 | 623.69 | 623.73 |
| Alumina | 192.23 | 99.12 | 0 | 0 | 191.84 | 191.54 | 0 | 182.65 | 0 |
| Alumina, hydrated | 0 | 142.40 | 293.98 | 293.37 | 0 | 0 | 291.70 | 0 | 279.33 |
| Magnesia | 14.06 | 14.06 | 14.06 | 13.96 | 13.96 | 13.96 | 13.96 | 29.26 | 29.26 |
| Limestone | 59.39 | 59.39 | 59.39 | 59.39 | 59.39 | 59.39 | 59.02 | 79.24 | 79.24 |
| Strontium carbonate | 5.16 | 5.16 | 5.16 | 5.16 | 5.16 | 5.16 | 5.02 | 29.34 | 29.34 |
| Barium carbonate | 51.92 | 51.92 | 51.92 | 51.79 | 51.79 | 51.79 | 51.53 | 80.48 | 80.48 |
| Lanthanum oxide | 111.63 | 111.63 | 111.63 | 111.42 | 111.42 | 111.22 | 110.72 | 0 | 0 |
| Yttrium oxide | 29.40 | 29.40 | 29.40 | 29.30 | 29.30 | 29.30 | 29.20 | 0 | 0 |
| Tin (IV) Oxide | 2.01 | 2.01 | 2.01 | 3.91 | 3.91 | 5.92 | 1.91 | 2.21 | 2.21 |
| Barium nitrate | 34.32 | 34.32 | 34.32 | 34.15 | 34.15 | 34.15 | 33.97 | 38.61 | 38.61 |
| Boric acid | 0.00 | 0.00 | 0.00 | 0.00 | 0.00 | 0.00 | 0.00 | 22.70 | 22.70 |
| Sodium hydroxide | | | | | | | 9.81 | | |

TABLE 5b

Compositions of glasses prepared from crucible melts described in Example 5, expressed in weight percent.

| Composition (wt %) | 51 | 52 | 53 | 54 | 55 | 56 | 57 | 58 | 59 |
|---|---|---|---|---|---|---|---|---|---|
| $SiO_2$ | 54.74 | 54.74 | 54.74 | 54.65 | 54.64 | 54.52 | 54.31 | 61.45 | 61.45 |
| $Al_2O_3$ | 19.08 | 19.08 | 19.08 | 19.05 | 19.05 | 19.01 | 18.94 | 18.14 | 18.14 |
| MgO | 1.42 | 1.42 | 1.42 | 1.41 | 1.41 | 1.41 | 1.41 | 2.91 | 2.91 |
| CaO | 3.19 | 3.19 | 3.19 | 3.19 | 3.19 | 3.18 | 3.17 | 4.25 | 4.25 |
| SrO | 0.42 | 0.42 | 0.42 | 0.42 | 0.42 | 0.41 | 0.41 | 2.10 | 2.10 |
| BaO | 5.90 | 5.90 | 5.90 | 5.88 | 5.88 | 5.88 | 5.85 | 8.31 | 8.31 |
| $La_2O_3$ | 10.93 | 10.93 | 10.93 | 10.92 | 10.92 | 10.89 | 10.85 | 0.00 | 0.00 |
| $Y_2O_3$ | 2.90 | 2.90 | 2.90 | 2.89 | 2.89 | 2.89 | 2.88 | 0.00 | 0.00 |
| $SnO_2$ | 0.20 | 0.20 | 0.20 | 0.39 | 0.39 | 0.58 | 0.19 | 0.22 | 0.22 |
| $B_2O_3$ | 0.00 | 0.00 | 0.00 | 0.00 | 0.00 | 0.00 | 0.00 | 1.26 | 1.26 |
| $Na_2O$ | 0.00 | 0.00 | 0.00 | 0.00 | 0.00 | 0.00 | 0.79 | 0.00 | 0.00 |
| $Fe_2O_3$ | 0.03 | 0.02 | 0.02 | 0.02 | 0.03 | 0.03 | 0.02 | 0.03 | 0.03 |
| $NO_7$ | 1.19 | 1.19 | 1.19 | 1.18 | 1.18 | 1.18 | 1.17 | 1.33 | 1.33 |
| $Cl^-$ | 0.01 | 0.01 | 0.01 | 0.01 | 0.01 | 0.01 | 0.01 | 0.00 | 0.00 |

TABLE 5c

Compositions of glasses prepared from crucible melts described in Example 5, expressed in mole percent.

| Composition (mol %) | 51 | 52 | 53 | 54 | 55 | 56 | 57 | 58 | 59 |
|---|---|---|---|---|---|---|---|---|---|
| $SiO_2$ | 70.86 | 70.86 | 70.86 | 70.86 | 70.86 | 70.86 | 70.86 | 70.6 | 70.6 |
| $Al_2O_3$ | 14.56 | 7.56 | 0 | 0 | 14.56 | 14.56 | 0 | 12.28 | 0 |
| $Al_2O_3$ | 0 | 7 | 14.56 | 14.56 | 0 | 0 | 14.56 | 0 | 12.28 |
| MgO | 2.74 | 2.74 | 2.74 | 2.74 | 2.74 | 2.74 | 2.74 | 4.99 | 4.99 |
| CaO | 4.43 | 4.43 | 4.43 | 4.43 | 4.43 | 4.43 | 4.43 | 5.23 | 5.23 |
| SrO | .31 | .31 | .31 | .31 | .31 | .31 | .31 | 1.40 | 1.40 |
| BaO | 1.99 | 1.99 | 1.99 | 1.99 | 1.99 | 1.99 | 1.99 | 2.74 | 2.74 |
| $La_2O_3$ | 2.61 | 2.61 | 2.61 | 2.61 | 2.61 | 2.61 | 2.61 | 0 | 0 |
| $Y_2O_3$ | 1.00 | 1.00 | 1.00 | 1.00 | 1.00 | 1.00 | 1.00 | 0 | 0 |
| $SnO_2$ | 0.10 | 0.10 | 0.10 | 0.2 | 0.2 | 0.3 | 0.10 | 0.10 | 0.10 |
| BaO | 1 | 1 | 1 | 1 | 1 | 1 | 1 | 1 | 1 |
| $B_2O_3$ | 0 | 0 | 0 | 0 | 0 | 0 | 0 | 1.25 | 1.25 |
| $Na_2O$ | 0 | 0 | 0 | 0 | 0 | 0 | 1 | 0 | 0 |

TABLE 6a1

Compositions of batch materials, expressed in grams, for crucible melts described in Example 6.

| Batch Material | 61 | 62 | 63 | 64 |
|---|---|---|---|---|
| Sand | 608.27 | 616.75 | 568.66 | 609.37 |
| Alumina | 84.32 | 72.69 | 81.04 | 173.87 |
| Boric oxide | 29.38 | 52.59 | 118.86 | 118.76 |
| Soda Ash | 199.39 | 176.49 | 98.95 | 82.7 |
| Potassium carbonate | 46.21 | 40.91 | 23.11 | 23.1 |
| Lithium carbonate | 10.49 | 21.23 | 52.2 | 51.95 |
| Magnesia | 29.26 | 22.14 | −0.13 | −0.14 |
| Limestone | 6.004 | 4.321 | −0.48 | −0.45 |
| Tin (IV) oxide | 0 | 0 | 46 | 0 |

TABLE 6a1-continued

Compositions of batch materials, expressed in grams, for crucible melts described in Example 6.

| Batch Material | 61 | 62 | 63 | 64 |
|---|---|---|---|---|
| Arsenic Pentoxide | 0 | 0 | 0 | 6.986 |
| Sodium nitrate | 0 | 0 | 0 | 26.04 |
| Alumina, hydrated | 143.32 | 145 | 142.4 | 0 |

TABLE 6a2

Compositions of batch materials, expressed in grams, for crucible melts described in Example 6.

| Batch Material | 66 | 67 |
|---|---|---|
| Sand | 350.12 | 350.11 |
| Alumina | 0 | 79.05 |
| Alumina, hydrated | 241.72 | 119.71 |
| Boric acid | 116.71 | 116.71 |
| Soda ash | 195.24 | 97.92 |
| Sodium hydroxide | 0 | 73.77 |
| Potassium carbonate | 57.69 | 57.69 |
| Magnesia | 15.07 | 15.07 |
| Limestone | 3.956 | 4.191 |
| Tin (IV) oxide | 230 | 230 |
| Cerium (IV) oxide | 26 | 26 |

TABLE 6b1

Compositions of glasses prepared from crucible melts of batch compositions listed in Table 6a1 and described in Example 6, expressed in mole percent.

| Composition (wt %) | 61 | 62 | 63 | 64 |
|---|---|---|---|---|
| $SiO_2$ | 60.66 | 61.5 | 60.83 | 60.74 |
| $Al_2O_3$ | 17.89 | 16.84 | 17.49 | 17.46 |
| $B_2O_3$ | 2.9 | 5.19 | 11.73 | 11.72 |
| $Na_2O$ | 11.69 | 10.35 | 5.82 | 5.81 |
| $K_2O$ | 3.14 | 2.78 | 1.57 | 1.57 |
| MgO | 0.42 | 0.85 | 2.09 | 2.08 |
| CaO | 2.89 | 2.19 | 0 | 0 |
| $SnO_2$ | 0.39 | 0.29 | 0 | 0 |
| $As_2O_3$ | 0 | 0 | 0.46 | 0 |
| $SO_3$ | 0 | 0 | 0 | 0.6 |
| $Sb_2O_3$ | 0 | 0 | 0 | 0 |
| $Fe_2O_3$ | 0 | 0 | 0 | 0 |
| $H_2O$ | 0.02 | 0.02 | 0.01 | 0.02 |
| Cl— | 0 | 0 | 0 | 0 |

TABLE 6b2

Compositions of glasses prepared from crucible melts of batch compositions listed in Table 6a2 and described in Example 6, expressed in mole percent.

| Composition (wt %) | 65 | 66 |
|---|---|---|
| $SiO_2$ | 60.03 | 60.03 |
| $Al_2O_3$ | 15.77 | 15.77 |
| $B_2O_3$ | 6.58 | 6.58 |
| $Na_2O$ | 11.45 | 11.45 |
| $K_2O$ | 3.92 | 3.92 |
| MgO | 1.49 | 1.49 |
| CaO | 0.26 | 0.26 |
| $SnO_2$ | 0.23 | 0.23 |
| $CeO_2$ | 0.26 | 0.26 |
| $Fe_2O_3$ | 0.01 | 0.01 |
| $H_2O$ | 0 | 0 |
| Cl— | 0 | 0 |

TABLE 6c1

Compositions of glasses prepared from crucible melts of batch compositions listed in Table 6a1 and described in Example 6, expressed in mole percent.

| Composition (mol %) | 61 | 62 | 63 | 64 |
|---|---|---|---|---|
| $SiO_2$ | 66.04 | 66.21 | 66.7 | 66.7 |
| $Al2O_3$ | 5.48 | 4.68 | 5.3 | 11.3 |
| $B_2O_3$ | 2.72 | 4.82 | 11.1 | 11.1 |
| $Na_2O$ | 12.37 | 10.83 | 6.2 | 5.2 |
| $K_2O$ | 2.18 | 1.91 | 1.1 | 1.1 |
| $Li_2O$ | 0.92 | 1.84 | 4.6 | 4.6 |
| MgO | 4.69 | 3.52 | 0 | 0 |
| CaO | 0.46 | 0.34 | 0 | 0 |
| $SnO_2$ | 0 | 0 | 0.2 | 0 |
| $As_2O_3$ | 0 | 0 | 0 | 0.2 |
| $Na_2O$ | 0 | 0 | 0 | 1 |
| $Al_2O_3$ | 6 | 6 | 6 | 0 |

TABLE 6c2

Compositions of glasses prepared from crucible melts of batch compositions listed in Table 6a2 and described in Example 6, expressed in mole percent.

| Composition (mol %) | 65 | 66 |
|---|---|---|
| $SiO_2$ | 65.23 | 65.23 |
| $Al_2O_3$ | 0 | 5.1 |
| $Al_2O_3$ | 10.1 | 5 |
| $B_2O_3$ | 6.17 | 6.17 |
| $Na_2O$ | 12.1 | 6.1 |
| $Na_2O$ | 0 | 6 |
| $K_2O$ | 2.72 | 2.72 |
| MgO | 2.41 | 2.41 |
| CaO | 0.3 | 0.3 |
| $SnO_2$ | 0.1 | 0.1 |
| $CeO_2$ | 0.1 | 0.1 |

The invention claimed is:

1. A silicate glass, the silicate glass having a seed concentration of less than about 1 seed/cm$^3$, wherein the silicate glass comprises: 60-72 mol % $SiO_2$; 6-14 mol % $Al_2O_3$; 0-3 mol % $B_2O_3$; 0-1 mol % $Li_2O$; 0-20 mol % $Na_2O$; 0-10 mol % $K_2O$; 0-2.5 mol % CaO; 0-5 mol % $ZrO_2$; 0-1 mol % $SnO_2$; and 0-1 mol % $CeO_2$, wherein 12 mol %≦$Li_2O$+$Na_2O$+$K_2O$≦20 mol %, and wherein the silicate glass comprises less than 50 ppm $As_2O_3$ and less than 50 ppm $Sb_2O_3$.

2. The silicate glass of claim 1, wherein the silicate glass further comprises up to about 8 mol % MgO.

3. The silicate glass of claim 2, wherein 0 mol %≦MgO+CaO≦10 mol %.

4. The silicate glass of claim 1, wherein the silicate glass comprises 0.1-1 mol % $SnO_2$.

5. The silicate glass of claim 1, wherein the silicate glass comprises 0.1-1 mol % $CeO_2$.

6. The silicate glass of claim 1, wherein the silicate glass is formed from batch or raw materials that include at least one of a hydrate fining agent, a hydroxide fining agent, or an oxidizer fining agent.

7. The silicate glass of claim 1, wherein the silicate glass is formed from batch or raw materials that include up to 4 mol % of at least one oxidizer fining agent.

8. The silicate glass of claim 7, wherein the at least one oxidizer fining agent comprises sodium sulfate, aluminum nitrate, alkali metal nitrates, alkaline earth metal nitrates, zirconium nitrate, ammonium nitrate, or combinations thereof.

9. The silicate glass of claim 7, wherein the at least one oxidizer fining agent comprises sodium sulfate.

10. The silicate glass of claim 1, wherein the silicate glass is ion-exchangeable, and when ion exchanged, has a surface compressive stress of at least about 200 MPa and a surface compressive layer having a depth of at least about 30 μm.

11. The silicate glass of claim 1, wherein the silicate glass comprises 0% $SO_3$.

12. The silicate glass of claim 1, wherein the silicate glass comprises 60-70 mol % $SiO_2$ and 8-18 mol % $Na_2O$.

13. A silicate glass, the silicate glass having a seed concentration of less than about 1 seed/cm³, wherein the silicate glass comprises: 60-72 mol % $SiO_2$; 6-14 mol % $Al_2O_3$; 0.63-3 mol % $B_2O_3$; 0-1 mol % $Li_2O$; 0-20 mol % $Na_2O$; 0-10 mol % $K_2O$; 0.57-10 mol % CaO; 0-5 mol % $ZrO_2$; 0-1 mol % $SnO_2$; and 0-1 mol % $CeO_2$, wherein 12 mol % $\leq Li_2O+Na_2O+K_2O \leq 20$ mol %, wherein the silicate glass comprises less than 50 ppm $As_2O_3$.

14. The silicate glass of claim 13, wherein the silicate glass further comprises up to about 8 mol % MgO.

15. The silicate glass of claim 14, wherein 0 mol % $\leq MgO+CaO \leq 10$ mol %.

16. The silicate glass of claim 13, wherein the silicate glass comprises less than 50 ppm of $Sb_2O_3$.

17. The silicate glass of claim 13, wherein the silicate glass comprises 0.1-1 mol % $SnO_2$.

18. The silicate glass of claim 13, wherein the silicate glass comprises 0.1-1 mol % $CeO_2$.

19. The silicate glass of claim 13, wherein the silicate glass comprises 0.57-2.5 mol % CaO.

20. The silicate glass of claim 13, wherein the silicate glass is formed from batch or raw materials that include at least one of a hydrate fining agent, a hydroxide fining agent, or an oxidizer fining agent.

21. The silicate glass of claim 13, wherein the silicate glass is formed from batch or raw materials that include up to 4 mol % of at least one oxidizer fining agent.

22. The silicate glass of claim 13, wherein the at least one oxidizer fining agent comprises sodium sulfate, aluminum nitrate, alkali metal nitrates, alkaline earth metal nitrates, zirconium nitrate, ammonium nitrate, or combinations thereof.

23. The silicate glass of claim 13, wherein the silicate glass is ion-exchangeable, and when ion exchanged, has a surface compressive stress of at least about 200 MPa and a surface compressive layer having a depth of at least about 30 μm.

24. The silicate glass of claim 13, wherein the silicate glass comprises greater than 0% $ZrO_2$.

25. The silicate glass of claim 13, wherein the silicate glass comprises 60-70 mol % $SiO_2$ and 8-18 mol % $Na_2O$.

26. A silicate glass, the silicate glass having a seed concentration of less than about 1 seed/cm³, wherein the silicate glass comprises: 60-72 mol % $SiO_2$; 6-14 mol % $Al_2O_3$; 0-15 mol % $B_2O_3$; 0-1 mol % $Li_2O$; 0-20 mol % $Na_2O$; 0-10 mol % $K_2O$; 0-10 mol % CaO; 0-5 mol % $ZrO_2$; 0-1 mol % $SnO_2$; and 0-1 mol % $CeO_2$, wherein 12 mol % $\leq Li_2O+Na_2O+K_2O \leq 20$ mol %, wherein 0.1 mol % $SnO_2+CeO_2 \leq 2$ mol %, and wherein the silicate glass is formed from batch or raw materials that include at least one oxidizer fining agent.

27. The silicate glass of claim 26, wherein the silicate glass comprises 0.1-1 mol % $CeO_2$.

28. The silicate glass of claim 26, wherein the silicate glass comprises less than 50 ppm $As_2O_3$ and less than 50 ppm of $Sb_2O_3$.

29. The silicate glass of claim 26, wherein the silicate glass comprises 0.63-15 mol % $B_2O_3$.

30. The silicate glass of claim 26, wherein the silicate glass comprises 0.57-10 mol % CaO.

* * * * *

UNITED STATES PATENT AND TRADEMARK OFFICE
CERTIFICATE OF CORRECTION

PATENT NO. : 8,431,502 B2
APPLICATION NO. : 13/495355
DATED : April 30, 2013
INVENTOR(S) : Matthew John Dejneka et al.

It is certified that error appears in the above-identified patent and that said Letters Patent is hereby corrected as shown below:

In the Specification

Col. 1, Line 50; Col. 1, Line 51; Col. 1, Line 56; Col. 1, Line 57; Col. 1, Line 61; Col. 1, Line 62; Col. 5, Line 23; Col. 5, Line 24; Col. 5, Line 29; Col. 5, Line 30, "$\leqq$" should read --$\leq$--;

Col. 1, Line 45, "the silicate glass. the silicate glass" should read --the silicate glass, the silicate glass--;

Col. 3, Line 40, "($Na_2Al_2Si_3O_{10}.2H_2O$)" should read --($Na_2Al_2Si_3O_{10} \cdot 2H_2O$)--;

Col. 4, Line 23-25, "$Al(OH)_3 \rightarrow AlO.(OH) + H_2O$, and $AlO.(OH) \rightarrow 1/2\ Al_2O_3 + 1/2\ H_2O$." should read --$Al(OH)_3 \rightarrow AlO \cdot (OH) + H_2O$, and $AlO \cdot (OH) \rightarrow 1/2\ Al_2O_3 + 1/2\ H_2O$.--;

Col. 7, Line 14, "a lapped and polished." should read --lapped and polished.--;

Col. 7, Line 54, "by placing it a molten" should read --by placing it in a molten--;

Col. 8, Line 26, "$Na_2O.Al_2O_3.2SiO_2$" should read --$Na_2O \cdot Al_2O_3 \cdot 2SiO_2$--;

Col. 8, Line 30, "acts as of a source" should read --acts as a source--;

Col. 8, Line 63, "$Na_2O.Al_2O_3.2SiO_2$" should read --$Na_2O \cdot Al_2O_3 \cdot 2SiO_2$--;

Col. 8, Line 67, "acts as of a source" should read --acts as a source--;

Col. 10, Line 19, "bubble/seeds" should read --bubbles/seeds--;

Col. 10, Line 57, "samples 25 and 25" should read --samples 25 and 26--;

Signed and Sealed this
Twenty-second Day of April, 2014

Michelle K. Lee
*Deputy Director of the United States Patent and Trademark Office*

CERTIFICATE OF CORRECTION (continued)
U.S. Pat. No. 8,431,502 B2

Col. 11, Line 14, "heated at 1600° for" should read --heated at 1600°C. for--;

Col. 12, Line 14, "sample 54) a;" should read --sample 54--;

Col. 21, Line 33, "mole percent" should read --weight percent--;

Col. 21, Line 53, "mole percent" should read --weight percent--;

Col. 22, Line 8, "Al2O$_3$" should read --Al$_2$O$_3$--;

In the Claims

Col. 22, Claim 1, Line 43; Col. 22, Claim 1, Line 44; Col. 22, Claim 3, Line 48-49; Col. 23, Claim 13, Lines 13-14; Col. 23, Claim 15, Line 19; Col. 24, Claim 26, Line 20; and Col. 24, Claim 26, Line 21, "$\leqq$" should read --$\leq$--; and Col. 24, Claim 26, Line 21, "wherein 0.1 mol% SnO$_2$ + CeO$_2\leqq$ 2 mol%" should read --wherein 0.1 mol%$\leq$ SnO$_2$ + CeO$_2\leq$ 2 mol%--.